United States Patent
Cooper

(10) Patent No.: US 10,577,200 B2
(45) Date of Patent: Mar. 3, 2020

(54) AUTOMATED LOADING SYSTEM ALIGNMENT ASSEMBLY

(71) Applicant: GPCP IP Holdings LLC, Atlanta, GA (US)

(72) Inventor: William Michael Cooper, Crossett, AR (US)

(73) Assignee: GPCP IP Holdings LLC, Atlanta, GA (US)

( * ) Notice: Subject to any disclaimer, the term of this patent is extended or adjusted under 35 U.S.C. 154(b) by 0 days.

(21) Appl. No.: 16/205,640

(22) Filed: Nov. 30, 2018

(65) Prior Publication Data

US 2019/0092585 A1    Mar. 28, 2019

Related U.S. Application Data

(63) Continuation of application No. 15/433,133, filed on Feb. 15, 2017, now Pat. No. 10,179,710.

(60) Provisional application No. 62/302,969, filed on Mar. 3, 2016.

(51) Int. Cl.
| | |
|---|---|
| *B65G 69/00* | (2006.01) |
| *B65G 67/04* | (2006.01) |
| *B65G 69/28* | (2006.01) |
| *B65G 67/20* | (2006.01) |
| *B66F 9/14* | (2006.01) |

(52) U.S. Cl.
CPC ............ *B65G 67/04* (2013.01); *B65G 67/20* (2013.01); *B65G 69/006* (2013.01); *B65G 69/287* (2013.01); *B66F 9/146* (2013.01)

(58) Field of Classification Search
CPC .... B65G 69/006; B65G 69/287; B65G 67/04; B65G 67/20; B65G 67/02

USPC ................................................. 414/396, 584
See application file for complete search history.

(56) References Cited

U.S. PATENT DOCUMENTS

| | | | | |
|---|---|---|---|---|
| 3,961,714 | A | * | 6/1976 | Buehler ................. B65G 67/04 414/572 |
| 3,971,585 | A | | 7/1976 | Labudde |
| 4,268,201 | A | | 5/1981 | Cayton |
| 4,605,255 | A | | 8/1986 | Olson |
| 4,640,657 | A | | 2/1987 | Moore et al. |
| 4,906,159 | A | | 3/1990 | Sabo et al. |
| 4,950,118 | A | | 8/1990 | Mueller et al. |
| 5,036,593 | A | | 8/1991 | Collier |
| 5,259,821 | A | | 11/1993 | Bryant |
| 6,349,497 | B1 | | 2/2002 | Roddenbery |
| 7,090,596 | B2 | | 8/2006 | David |
| 7,118,148 | B1 | | 10/2006 | Davis |
| 7,965,396 | B2 | | 6/2011 | Ashford et al. |

(Continued)

OTHER PUBLICATIONS

International Search Report and Written Opinion dated May 31, 2017 cited in Application No. PCT/US2017/018781, 11 pgs.

*Primary Examiner* — Mark C Hageman
(74) *Attorney, Agent, or Firm* — Laura L. Bozek

(57) ABSTRACT

Examples of an alignment assembly for loading a shipping container are disclosed. In one example implementation according to aspects of the present disclosure, the alignment assembly includes a base rotatably disposed on a pole and an alignment bracket moveably connected to the base. The alignment bracket may include a main support member connected to an alignment member. The alignment bracket is configured to permit the alignment member to be disposed substantially co-planer with a sidewall of the shipping container.

11 Claims, 8 Drawing Sheets

(56) References Cited

U.S. PATENT DOCUMENTS

| | | |
|---|---|---|
| 7,980,808 B2 | 7/2011 | Chilson et al. |
| 8,152,527 B2 | 4/2012 | Kobett |
| 8,210,791 B2 | 7/2012 | Chilson et al. |
| 8,780,361 B2 | 7/2014 | Ashford et al. |
| 8,955,846 B2 | 2/2015 | Frickey |
| 2005/0053451 A1 | 3/2005 | Gagnon et al. |
| 2008/0252017 A1 | 10/2008 | Rowan |
| 2009/0202330 A1 | 8/2009 | Hamather |
| 2010/0266381 A1 | 10/2010 | Chilson et al. |

* cited by examiner

AUTOMATED LOADING SYSTEM ALIGNMENT ASSEMBLY

DOMESTIC PRIORITY

This application is a continuation of U.S. application Ser. No. 15/433,133 filed Feb. 15, 2017, which claims the benefits of U.S. Provisional Application No. 62/302,969 filed Mar. 3, 2016, the disclosures of which are incorporated by reference herein in their entirety.

BACKGROUND

The present disclosure relates generally to automated loading systems and, more particularly, to an alignment assembly for an automated loading system.

Automated loading systems utilize loading vehicles (e.g., laser guided vehicles (LGVs)) to load and unload containers or trailers with pallets for shipping. For example, a LGV may be used to load a semi-truck trailer at a shipper's distribution center with pallets of goods to be shipped to a customer, such as a retailer. LGVs reduce labor while increasing speed and accuracy during loading, thereby reducing cost to the shipper and the customer.

LGVs use laser sensors to navigate the space in which they operate (e.g., the distribution center). In this way, an LGV may autonomously retrieve pallets of goods and load the pallets onto an awaiting trailer or container. The pallets are loaded according to a user-defined and/or system-defined loading scheme. For example, a standard pallet may measure 40" by 48". The pallets may be loaded onto a trailer with a known length using a loading scheme to load as many pallets from the front of the trailer to the back of the trailer as possible while leaving as little free space as possible. The free space (i.e., space between pallets and space between the trailer and pallets) permits the pallets and/or their contents to shift during transit. A "load shift" can be costly to the shipper as an order may be declined by the customer if it is damaged, causing the shipper to lose revenue, lose customers, and/or send replacement shipments at the shipper's own expense. Load shift is especially prevalent near the rear of the trailer where significant free space may exist between the last pallet on the trailer and the back of the trailer (i.e., the trailer doors).

Various techniques have been implemented to reduce load shift with marginal success. In one example where two rows of pallets are placed in a trailer, airbags are placed between the pallets. This technique attempts to pin the pallets and their contents against the trailer walls to prevent load shift. However, this technique is not always effective because the airbags may shift or become deflated, and it increases cost and waste by requiring the addition of airbags. In another example, bracing (e.g., wooden supports, metal supports, etc.) may be affixed to the trailer to brace the last pallet(s) to prevent the pallet from shifting into the free space. Again, this increases cost and waste and is not always effective as the supports may become dislodged or broken in transit, leaving the pallets and their contents free to shift.

Reducing free space between the last pallet(s) and the rear of the trailer has proven most effective. However, existing automated loading systems lack the ability to load pallets at the rear of the trailer.

SUMMARY

According to examples of the present disclosure, techniques including methods, systems, and/or apparatus for an alignment assembly for loading a shipping container are provided. In one example implementation according to aspects of the present disclosure, an alignment assembly is provided. The alignment assembly includes a base rotatably disposed on a pole and an alignment bracket moveably connected to the base. The alignment bracket may include a main support member connected to an alignment member. The alignment bracket is configured to permit the alignment member to be disposed substantially co-planer with a sidewall of the shipping container.

In another example implementation according to aspects of the present disclosure, a method for loading a shipping container using an alignment assembly is provided. The method includes automatically navigating a loading vehicle to the shipping container, the loading vehicle comprising a clamp to secure a pallet on the loading vehicle. The method also includes engaging the alignment assembly with the clamp of the loading vehicle to align the pallet with the shipping container. The alignment assembly includes a base connectable to a pole, and an alignment bracket moveably connected to the base, the alignment bracket comprising a main support member connected to an alignment member. The alignment bracket is configured to permit the alignment member to be disposed substantially co-planer with a sidewall of the shipping container. The method may further include loading the pallet onto the shipping container.

In yet another example implementation according to aspects of the present disclosure, a system for loading a shipping container is provided. The system includes a loading vehicle comprising a clamp to secure a pallet on the loading vehicle, the shipping container, and an alignment assembly. The alignment assembly includes a base connectable to a pole, and an alignment bracket moveably connected to the base, the alignment bracket comprising a main support member connected to an alignment member. The alignment bracket is configured to permit the alignment member to be disposed substantially co-planer with a sidewall of the shipping container.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Various implementations are described below by referring to several examples of an alignment assembly for a loading vehicle. In examples, an alignment assembly comprises a base connectable to a pole and an alignment bracket moveably connected to the base. The alignment bracket comprises a main support member connected to an alignment member, and the alignment bracket is configured to permit the alignment member to be disposed substantially co-planer with a sidewall of the shipping container. The alignment assembly may be used by a loading vehicle to load a pallet of goods onto or into a shipping container, such as a trailer.

The present techniques enable a container such as a trailer to be loaded autonomously to maximize the amount of goods loaded onto the trailer and to minimize the load shift potential of the goods during transit. Moreover, the present techniques enable loading to a back edge of a container without modifying existing automatic loading systems and/or loading vehicles used to load the container. Loading to the back edge minimizes the load shift potential of the goods during transit. These and other advantages will be apparent from the description that follows.

Figure 1:
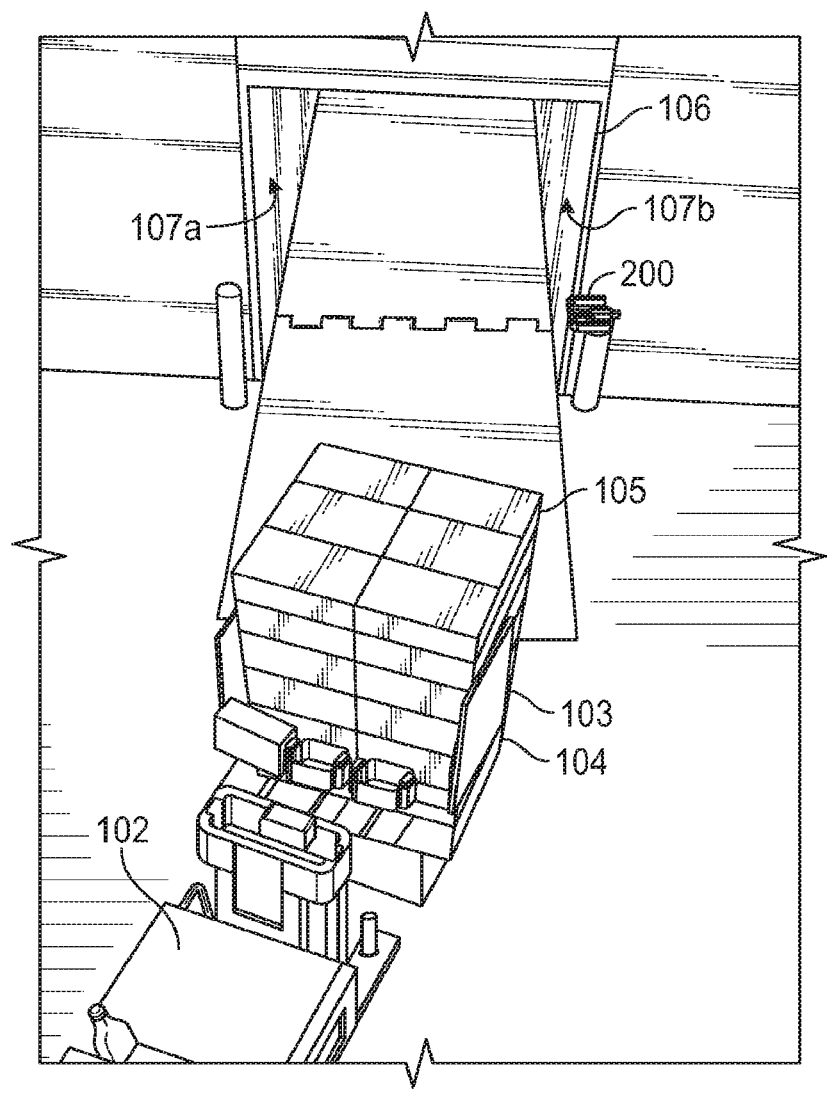
FIG. 1 illustrates a diagram of a loading vehicle loading a pallet into a shipping container according to examples of the present disclosure.

FIG. 1 illustrates a diagram of a loading vehicle 102 (e.g., a laser guided vehicle) loading a pallet 104 into a shipping container 106 (e.g., a trailer) according to examples of the present disclosure.

In the example of FIG. 1, shipping container 106 may be semi-trailer pulled by a tractor vehicle, for example, and may be approximately 53' or 57' in length from the front to the back (referred to herein as "forward load space"). In examples, a 53' trailer has approximately 628" of forward load space, while a 57' trailer has approximately 676" of forward load space. Both the 53' and 57' trailers have approximately 98" to 100" of loadable space between the two sidewalls 107a, 107b of the trailer (referred to herein as "lateral load space"). It should be appreciated that the dimensions discussed herein are merely examples and that the present techniques may also apply to other trailer sizes. It should also be appreciated that, although the present disclosure relates to trailers, such as shipping container 106, other types of containers, such as shipping containers, may be used.

Pallets, such as pallet 104, contain goods 105 and may be loaded into shipping container 106 in a variety of ways. Although pallet sizes may vary, a standard 40" by 48" pallet may be used. In an example of a 53' trailer with 628" of forward load space and 100" of lateral load space, pallet 104 may be loaded in one of two alignments. In a first alignment, pallet 104 is aligned such that the 48" side of pallet 104 fills the lateral load space while the 40" side of pallet 104 fills the forward load space. In such an example, two rows of pallets are loaded into shipping container 106 with 15 pallets in each row. If each row is stacked along one of the two sidewalls 107a, 107b of shipping container 106 with 100" of lateral load space, the resulting two rows are positioned approximately 4" apart (i.e., a 4" lateral load gap exist between the two rows). Also, if each row begins at the interior front of shipping container 106 with 628" of forward load space, the resulting two rows are positioned such that 28" of unloaded (i.e., empty) space exists between the last pallet in each row and the interior back (i.e., doors) of shipping container 106. This may be referred to as a forward load gap. The forward load gap may result in one or more of the pallets in each row shifting during transit.

Similarly, in a second alignment, pallet 104 is aligned such that the 48" side of pallet 104 fills the forward load space while the 40" side of pallet 104 fills the lateral load space. In such an example, the two rows of pallets are loaded into shipping container 106 with 13 pallets in each row. If each row is stacked along one of the two sidewalls 107a, 107b of shipping container 106 with 100" of lateral load space, the resulting two rows are with 20" of lateral load gap and 4" of forward load gap. Although this configuration results in less of a lateral load gap (4" versus 28"), it also reduces the number of pallets that can be loaded onto shipping container 106 from 30 (15 per row) to 26. (13 per row).

The combination of the lateral load gap and the forward load gap may permit the pallets to shift in shipping container 106 during transit, potentially causing damage to the goods 105 on the pallets. One technique for reducing the amount of forward load gap, which is a significant factor in whether a load may shift during transit, is to load the pallets to the back interior edge of shipping container 106 to fill the forward load space. To do so, several of the pallets in a row may be rotated (or "pin wheeled") 90 degrees to enable as many pallets as possible to be loaded while reducing forward load space.

While loading in this manner reduces the potential of a load shift during transit, loading to the back interior edge of the trailer using an automated loading system and loading vehicles (e.g., loading vehicle 102) is difficult because the loading vehicle 102 uses sidewalls 107a, 107b of shipping container 106 as reference points for alignment purposes when positioning the pallets laterally within shipping container 106.

Figure 2:
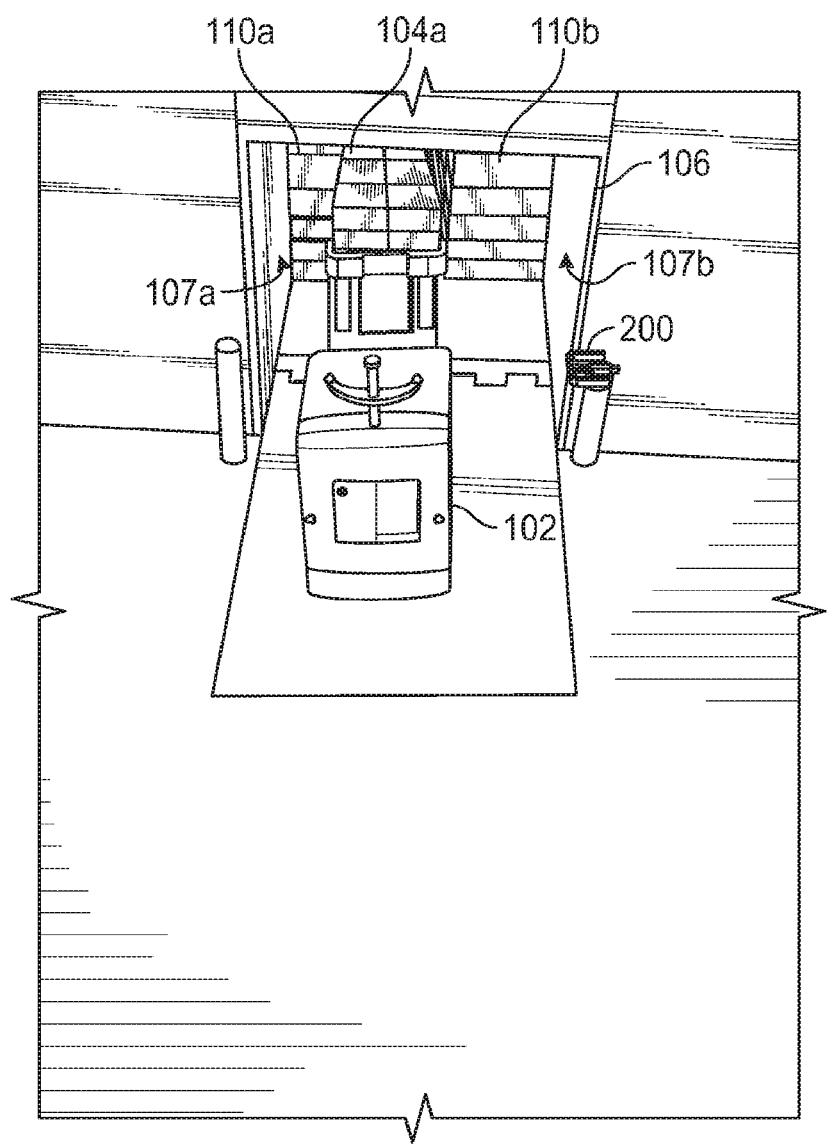
FIG. 2 illustrates a diagram of a loading vehicle loading a pallet into a shipping container according to examples of the present disclosure.

FIG. 2 illustrates a diagram of a loading vehicle 102 loading a pallet 104a into shipping container 106 according to examples of the present disclosure. As illustrated in FIG. 2, when the last pallet (e.g., pallet 104a) on a first row (in this case, the left row) is positioned within shipping container 106, loading vehicle 102 enters shipping container 106 in a central lateral portion of shipping container 106. Then, the loading vehicle 102 moves laterally (e.g., loading vehicle 102 moves left) to sidewall 107a of shipping container 106 and places pallet 104a as the last pallet on in the left row. As best illustrated in FIG. 1, the loading vehicle 102 includes a clamp 103 that is equipped with a sensor, such as a pressure sensor 103a shown in FIG. 4, to enable loading vehicle 102 to recognize when clamp 103 contacts a surface, such as sidewall 107a (or sidewall 107b). Once the sensor of clamp 103 contacts sidewall 107a, the lateral movement stops and pallet 104a is positioned adjacent to pallet 110a directly in front of pallet 104a.

Figure 3:
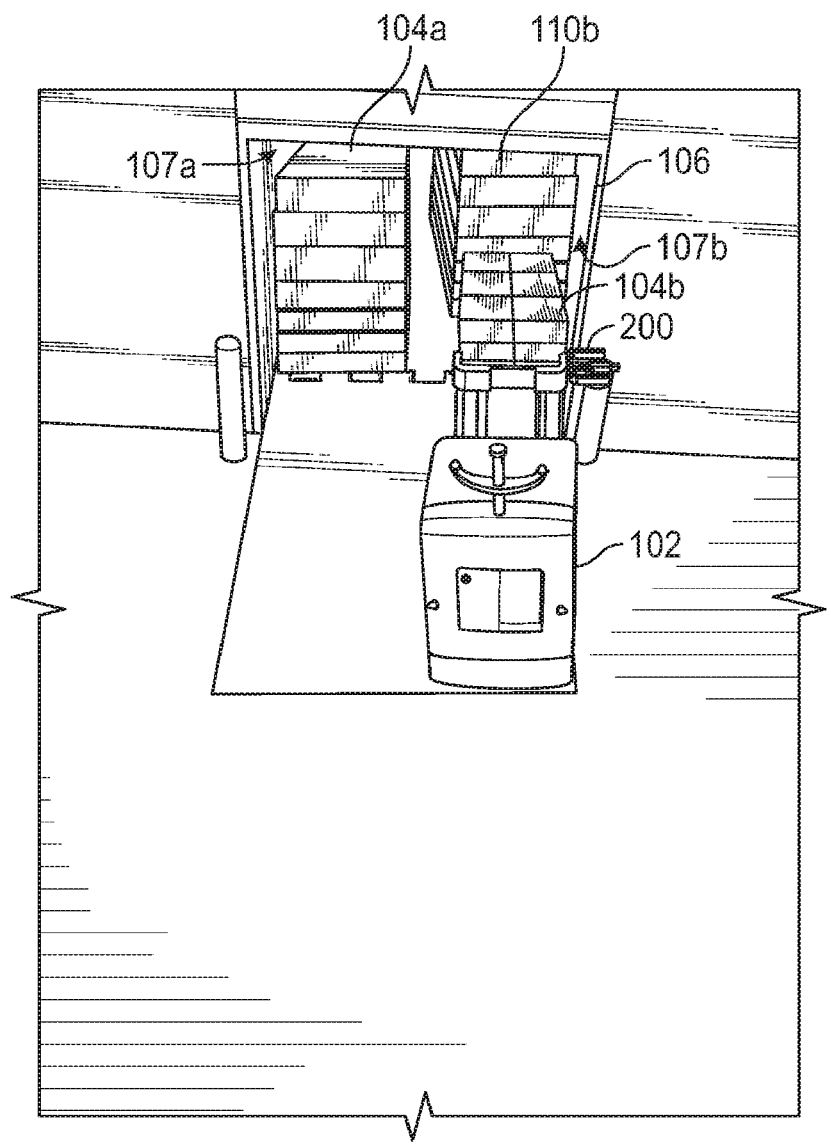
FIG. 3 illustrates a diagram of a loading vehicle loading a pallet into a shipping container using an alignment assembly according to examples of the present disclosure.

FIG. 3 illustrates a diagram of loading vehicle 102 loading pallet 104b into shipping container 106 using an alignment assembly 200. In particular, as illustrated in FIG. 3, loading vehicle 102 cannot place the last pallet (e.g., pallet 104b) in the right row in the same manner it placed pallet 104a because pallet 104a at least partially occupies the central lateral portion of shipping container 106. Therefore, loading vehicle 102 cannot enter shipping container 106 in the central lateral portion and move laterally to the right. Rather, loading vehicle 102 must move forward directly into the empty space between pallet 110b (the second-to-last pallet in the right row) without the ability to move laterally within that space. However, loading vehicle 102 has no frame of reference as to the sidewall 107b of shipping container 106 to load pallet 104b into shipping container 106. In other words, clamp 103 cannot contact with sidewall 107b to position pallet 104b within shipping container 106.

Figure 4:
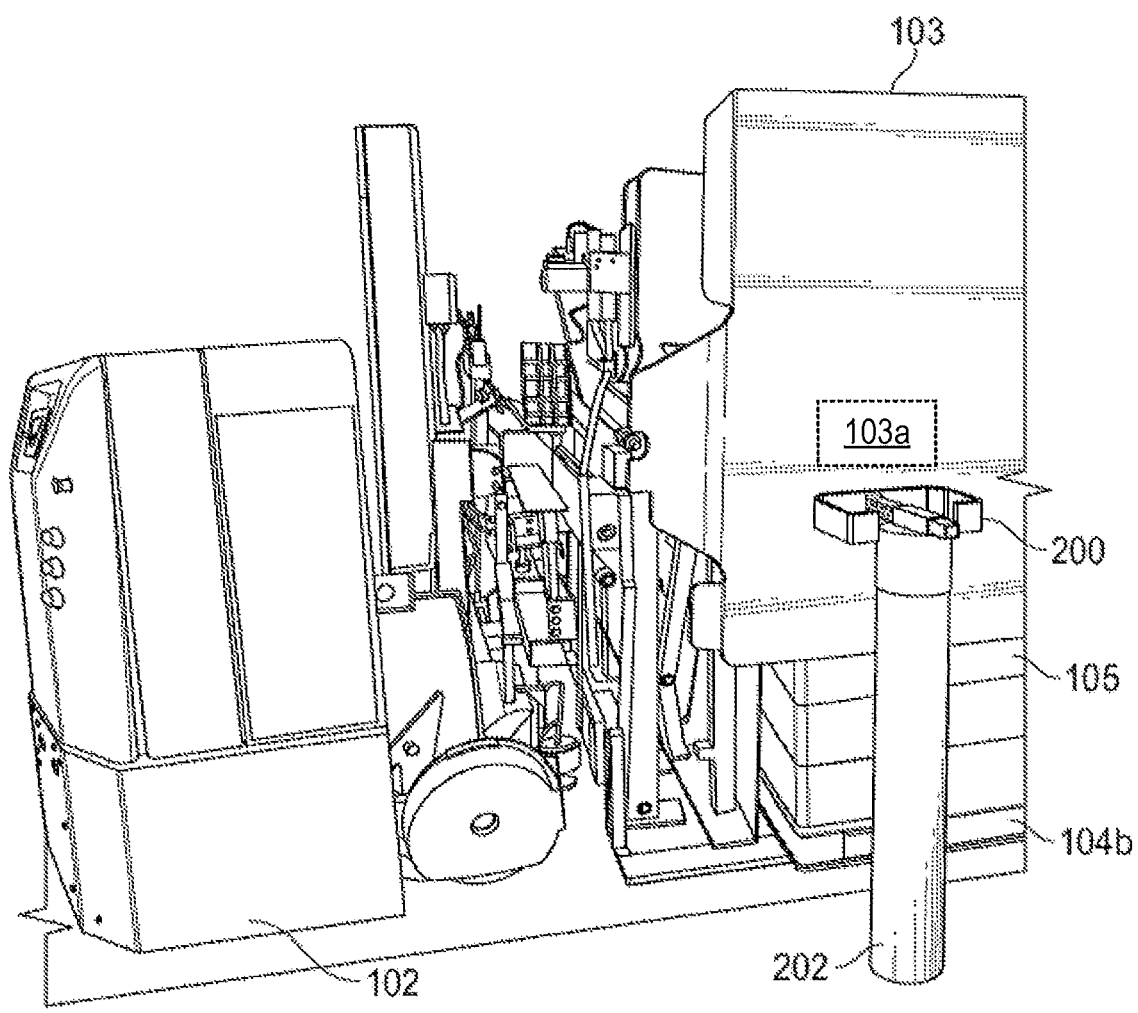
FIG. 4 illustrates a diagram of a loading vehicle loading a pallet into a shipping container using an alignment assembly according to examples of the present disclosure.

To provide the frame of reference for alignment purposes to enable loading vehicle 102 to align with sidewall 107b of shipping container 106, alignment assembly 200 is used. FIG. 4 illustrates clamp 103 of loading vehicle 102 coming into contact with alignment assembly 200. Once clamp 103 of loading vehicle 102 contacts alignment assembly 200, loading vehicle 102 may move forward to load pallet 104b into shipping container 106.

Figure 5:
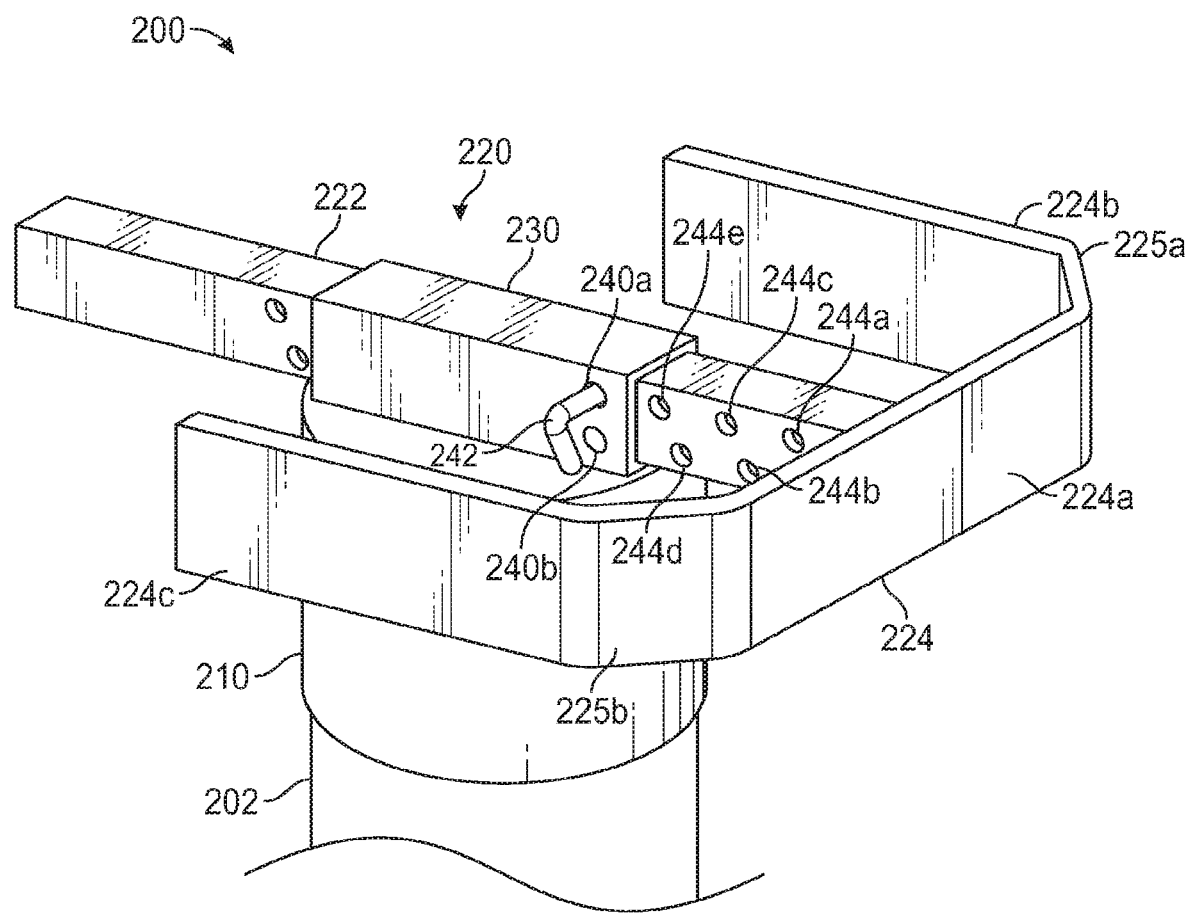
FIG. 5 illustrates a diagram of an alignment assembly for a loading a vehicle according to examples of the present disclosure.

FIG. 5 illustrates a diagram of an alignment assembly 200 for a loading vehicle according to an example of the present disclosure. In particular, alignment assembly 200 comprises a base 210 connectable to a pole 202. Alignment assembly 200 also comprises an alignment bracket 220, which comprises a main support member 222 connected to an alignment member 224. In examples, alignment member 224 comprises a first alignment portion 224a, connected to main support member 222, a second alignment portion 224b connected to first alignment portion 224a, and a third alignment portion 224c connected to first alignment portion 224a. Further, second alignment portion 224b may be connected to first alignment portion 224a at an approximate 90 degree angle and third alignment portion 224c may be connected to first alignment portion 224a at an approximate 90 degree angle. Consequently, second alignment portion 224b is approximately parallel to third alignment portion 224c. In another example, such as illustrated in FIG. 5, a first angular alignment portion 225a may be disposed between first alignment portion 224a and second alignment portion 224b and a second angular alignment portion 225b may be disposed between first alignment portion 224a and third alignment portion 224c.

Figure 6:
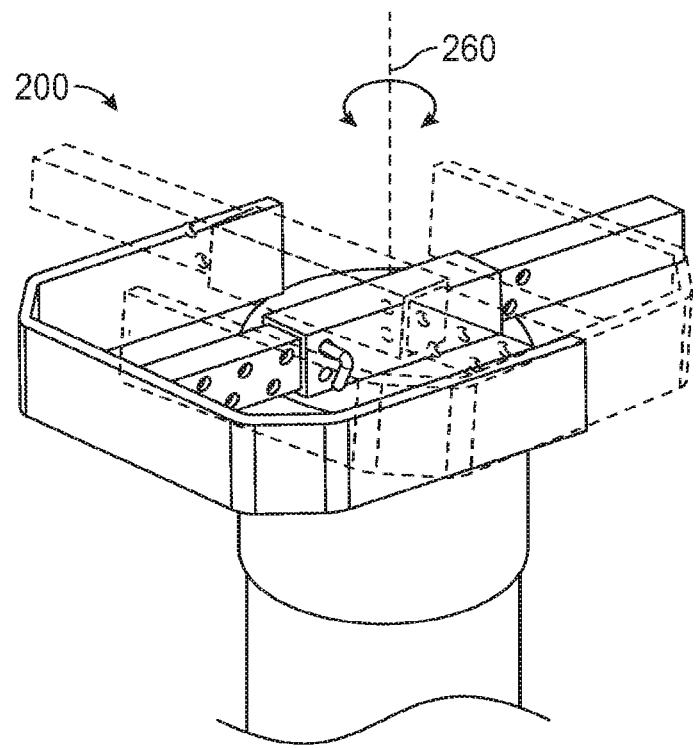
FIG. 6 illustrates a diagram of an alignment assembly for a loading a vehicle according to examples of the present disclosure.

In examples, base 210 is rotatably connected to pole 202 such that alignment assembly 200 may rotate about pole 202. For example, FIG. 6 illustrates a diagram of alignment assembly 200 for loading a vehicle according to examples of the present disclosure. Alignment assembly 200 may rotate about pole 202 along axis 260. In examples, if a loading vehicle loading a shipping container contacts alignment bracket 220 incorrectly (e.g., the loading vehicle hits second alignment portion 224b and/or third alignment portion 224c), alignment assembly 200 rotates about axis 260. It should be appreciated that, although alignment assembly 200 may rotate about axis 260, the weight of the alignment assembly 200 may provide sufficient friction against pole 202 such that alignment assembly 200 remains in place when minor forces act upon it. For example, a minor bump against alignment assembly 200 may not cause alignment assembly 200 to rotate about axis 260; however, a significant force, such as might be applied by a loading vehicle hitting first alignment portion 224a and/or third alignment portion 224c causes alignment assembly 200 to rotate about axis 260. This reduces the likelihood that alignment assembly 200 may break if it is contacted incorrectly.

Figure 7:
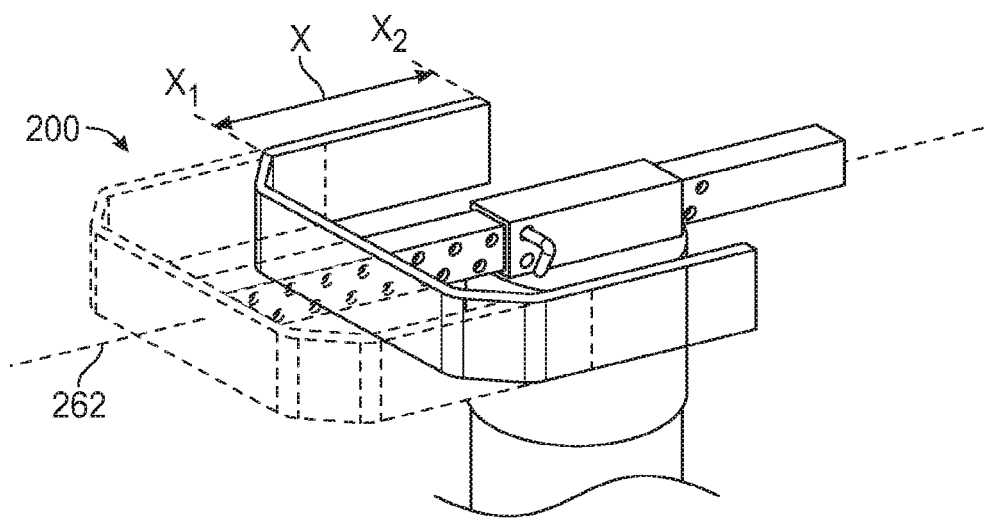
FIG. 7 illustrates a diagram of an alignment assembly for a loading a vehicle according to examples of the present disclosure.

Additionally, base 210 is moveably connected to pole 202 such that alignment assembly 200 may be moved from pole 202. For example, FIG. 7 illustrates a diagram of alignment assembly 200 for loading a vehicle according to examples of the present disclosure. In FIG. 7, alignment bracket 220 is moveably connected to base 210. Alignment bracket 220 is thereby configured to permit alignment member 224 to be disposed substantially co-plainer with a sidewall of a shipping container. Accordingly, alignment bracket 220 moves along an axis 262 a distance x between two points $x_1$ and $x_2$.

Continuing with reference to FIG. 5, in examples, a sleeve 230 is connected to the base 210 and may form a channel to receive main support member 222. Main support member 222 may be adjustably restrained in sleeve 230 such that alignment bracket 220 cannot move with respect to base 210. For example, sleeve 230 may comprise at least one fastener hole 240a, 240b to receive a fastener 242 and main support member 222 of alignment bracket 220 may comprise a plurality of adjustment holes 244a, 244b, 244c, 244d, 244e to receive fastener 242. It should be appreciated that sleeve and adjustment fastener arrangement illustrated is but one technique to enable alignment bracket 220 to be moveably connected to base 210.

As illustrated in FIGS. 5 and 7, main support member 222 comprises a first row of adjustment holes 244a, 244c, 244e, and a second row of adjustment holes 244b, 244d. The use of the two adjustment rows enables a finer granularity of adjustability. For example, adjustment holes 244a, 244c, 244e may be of a diameter greater than the distance between adjustment holes 244a, 244c, 244e. By offsetting the alignment holes as illustrated in FIG. 5, finer adjustments of alignment bracket 220 may be made by inserting fastener 242 into either fastener hole 240a or fastener hole 240b, which correspond respectively to the first and second rows of adjustment holes of main support member 222, to moveably connect alignment bracket 220 to base 210.

It should be appreciated that alignment bracket 220 is in a fixed relation to the base 210 when fastener 242 engages one of fastener holes 240a, 240b of sleeve 230 while engaging one of the plurality of adjustment holes 244a, 244b, 244c, 244d, 244e. Conversely, alignment bracket 220 is in a moveable relation to base 210 when fastener 242 disengages at least one of the fastener holes 240a, 240b of sleeve 230 and the plurality of adjustment holes 244a, 244b, 244c, 244d, 244e. In other examples, other techniques may be utilized to enable alignment bracket 220 to be moveably connected to base 210. For example, a tightening member, such as a screw, may be utilized to apply a force to alignment bracket 220 from sleeve 230 to temporarily restrain alignment bracket 220 with respect to base 210.

Figure 8:
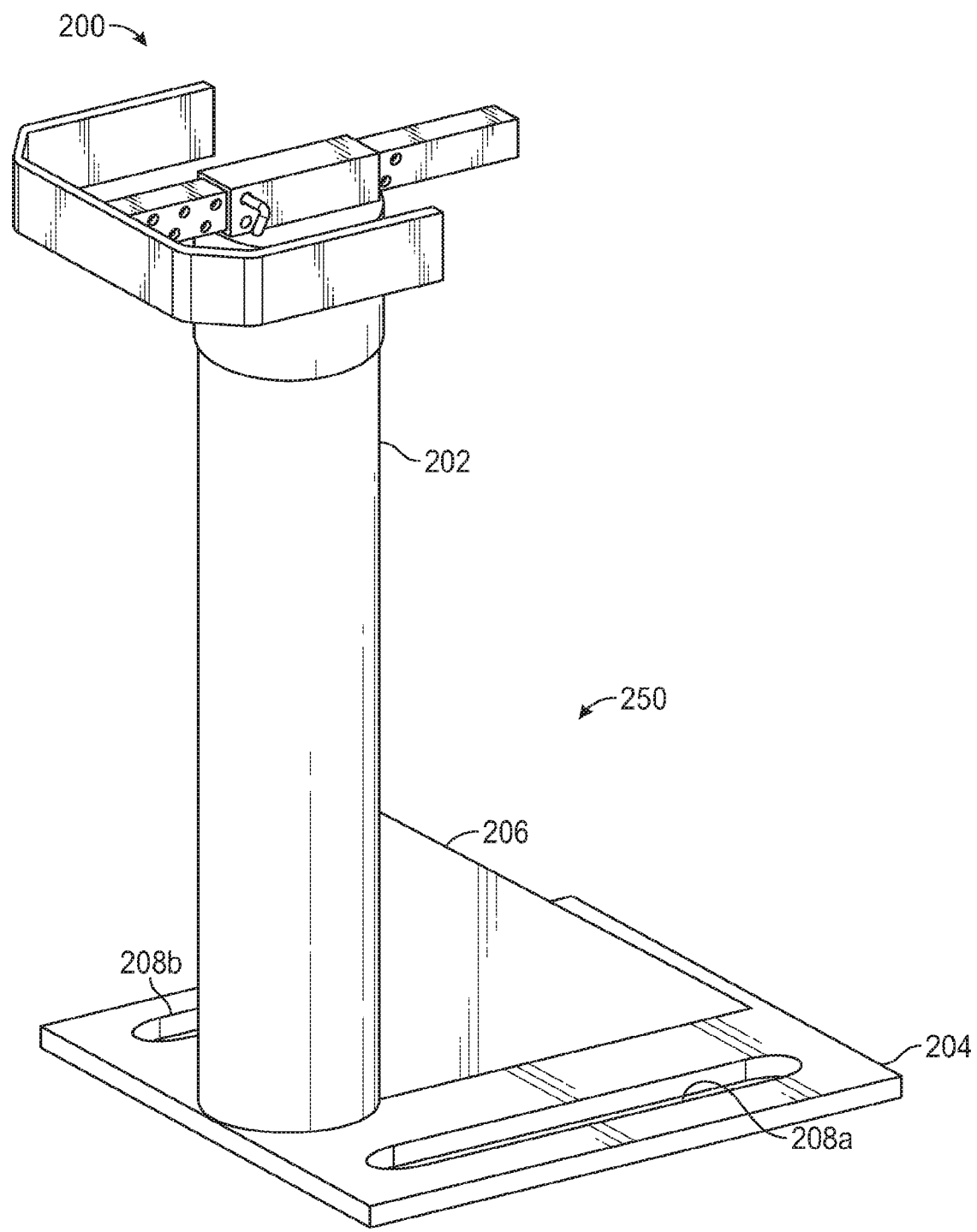
FIG. 8 illustrates a diagram of a support assembly for an alignment assembly according to examples of the present disclosure.

FIG. 8 illustrates a diagram of a support assembly 250 for an alignment assembly 200 according to examples of the present disclosure. Support assembly 250 comprises a pole 202 connected to a base 204 and supported by a support 206, which is connected to pole 202 and base 204. It should be appreciated that support 206 may be removed in some examples.

Support assembly 250 may be positioned external to a shipping container (e.g., shipping container 106 of FIG. 1). In examples, support assembly 250 is moveable with respect to the shipping container such that support assembly 250 may be moved to various locations and/or adjusted based on the specifications of a particular shipping container.

In examples, support assembly 250 is moveably connected to a surface, such as a floor of a distribution center. For example, channels 208a, 208b are configured to receive at least one fastener through channels 208a, 208b and into the surface. In this way, support assembly 250 may be moved along the axis formed by channels 208a, 208b. The fasteners used may vary in type, material, and number. It should be appreciated that support assembly 250 may also be removed from one location and moved to a second location by releasing the fasteners received in channels 208a, 208b.

Figure 9:
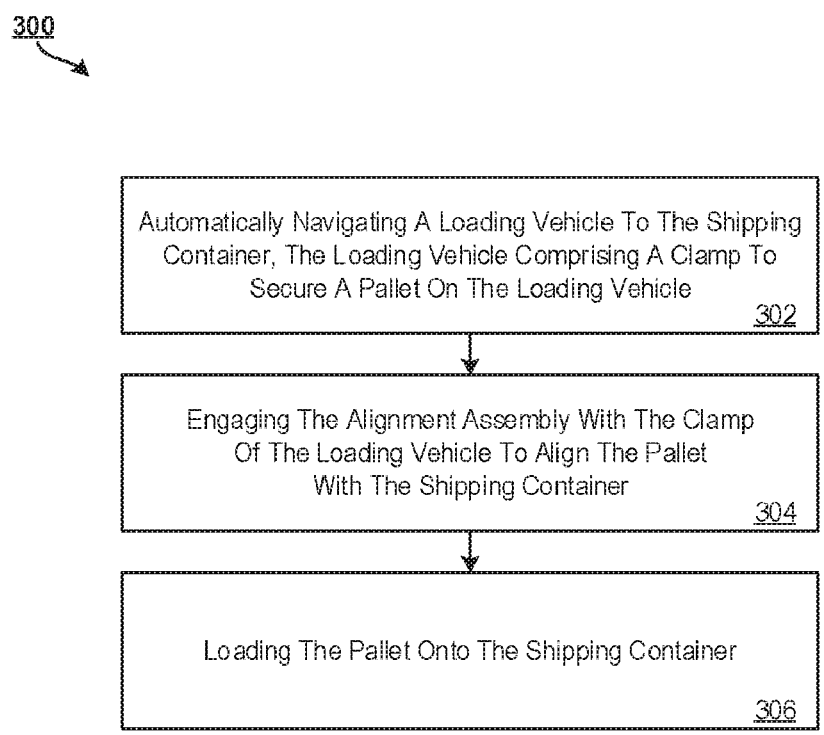
FIG. 9 illustrates a flow diagram of a method for loading a shipping container using an alignment assembly for a loading vehicle according to examples of the present disclosure.

FIG. 9 illustrates a flow diagram of a method 300 for loading a shipping container using an alignment assembly for a loading vehicle according to examples of the present disclosure. In particular at block 302, method 300 comprises automatically navigating a loading vehicle to the shipping container, the loading vehicle comprising a clamp to secure a pallet on the loading vehicle. In examples, the loading vehicle is a laser guided loading vehicle. In examples, securing the pallet on the loading vehicle comprises securing contents on the pallet.

At block 304, method 300 comprises engaging the alignment assembly with the clamp of the loading vehicle to align the pallet with the shipping container. The alignment assembly comprises a base connectable to a pole and an alignment bracket moveably connected to the base. The alignment bracket comprises a main support member connected to an alignment member, and the alignment bracket is configured to permit the alignment member to be disposed substantially co-planer with a sidewall of the shipping container. In examples, the alignment assembly is positioned external to the shipping container. At block 306, method 300 comprises loading the pallet onto the shipping container.

Additional processes also may be included. For example, method 300 may further comprise, prior to automatically navigating the loading vehicle to the shipping container, receiving the pallet onto the loading vehicle. Additionally, method 300 may comprise adjusting the alignment bracket with respect to the base. And it should be understood that the processes depicted in FIG. 9 represent illustrations, and that other processes may be added or existing processes may be removed, modified, or rearranged without departing from the scope and spirit of the present disclosure.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

The invention claimed is:

1. A system for loading a shipping container, the system comprising:
   a loading vehicle comprising a clamp to secure a pallet on the loading vehicle;
   the shipping container; and
   an alignment assembly comprising:
      a base connectable to a pole,
      an alignment bracket moveably connected to the base, the alignment bracket comprising a main support member connected to an alignment member, wherein the alignment member comprises a first alignment portion connected to the main support member, a second alignment portion connected to and extending from the first alignment portion, and a third alignment portion connected to and extending from the first alignment portion, wherein a first angular alignment portion is disposed between the first alignment portion and the second alignment portion, and wherein the alignment bracket is configured to permit the first alignment portion of the alignment member to be disposed substantially co-planar with a sidewall of the shipping container, wherein the second alignment portion is connected to and extends from the first alignment portion at an approximate 90 degree angle, wherein the third alignment portion is connected to and extends from the first alignment portion at an approximate 90 degree angle, and wherein the second alignment portion is approximately parallel to the third alignment portion,
   wherein the alignment assembly is entirely external to the shipping container during loading the shipping container.

2. The system of claim 1, further comprising:
   a sleeve connected to the base and forming a channel to receive the main support member of the alignment bracket.

3. The system of claim 2, wherein the sleeve comprises a fastener hole to receive a fastener, and wherein the main support member of the alignment bracket comprises a plurality of adjustment holes to receive the fastener.

4. The system of claim 1, wherein the pole is moveably connected to a building in which the loading vehicle operates.

5. The system of claim 1, wherein the base of the alignment assembly is rotatable about the pole.

6. The system of claim 1, wherein a second angular alignment portion is disposed between the first alignment portion and the third alignment portion.

7. An alignment assembly for loading a trailer, the alignment assembly comprising:
   a base rotatably disposed on a pole;
   an alignment bracket moveably connected to the base, the alignment bracket comprising a main support member connected to an alignment member, wherein the alignment member comprises a first alignment portion connected to the main support member, a second alignment portion connected to and extending from the first alignment portion, and a third alignment portion connected to and extending from the first alignment portion, and wherein a first angular alignment portion is disposed between the first alignment portion and the second alignment portion, wherein the second alignment portion is connected to and extends from the first alignment portion at an approximate 90 degree angle, wherein the third alignment portion is connected to and extends from the first alignment portion at an approximate 90 degree angle, and wherein the second alignment portion is approximately parallel to the third alignment portion; and
   a sleeve connected to the base and forming a channel to receive the main support member of the alignment bracket, wherein the sleeve comprises a first fastener hole and a second fastener hole being configured to receive a fastener, and wherein the main support member of the alignment bracket comprises a first plurality of adjustment holes arranged in a first row and a second plurality of adjustment holes arranged in a second row, the first row being substantially parallel to the second row, the first plurality of adjustment holes being offset from the second plurality of adjustment holes, the first plurality of adjustment holes and the second plurality of adjustment holes being configured to receive the fastener.

8. The alignment assembly of claim 7, wherein the alignment bracket is in a fixed relation to the base when the fastener engages the first fastener hole of the sleeve while engaging one of the first plurality of adjustment holes or when the fastener engages the second fastener hole of the sleeve while engaging one of the second plurality of adjustment holes.

9. The alignment assembly of claim 7, wherein the alignment bracket is in a moveable relation to the base when the fastener disengages at least one of the first fastener holes of the sleeve and the first plurality of adjustment holes and when the fastener disengages at least one of the second fastener hole of the sleeve and the second plurality of adjustment holes.

10. The alignment assembly of claim 7, wherein the base is rotatable about the pole.

11. The alignment assembly of claim 7, wherein a second angular alignment portion is disposed between the first alignment portion and the third alignment portion.

* * * * *